(12) United States Patent
Sötemann et al.

(10) Patent No.: US 9,643,126 B2
(45) Date of Patent: *May 9, 2017

(54) SYSTEM AND METHOD FOR THE CONCENTRATION OF A SLURRY

(71) Applicant: Omya International AG, Oftringen (CH)

(72) Inventors: Jörg Sötemann, Villach (AT); Herbert Einspieler, Ludmannsdorf (AT); Martin Schwarz, Hattingen (DE)

(73) Assignee: Omya International AG, Oftringen (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/976,130

(22) Filed: Dec. 21, 2015

(65) Prior Publication Data

US 2016/0144319 A1    May 26, 2016

Related U.S. Application Data

(62) Division of application No. 13/641,755, filed as application No. PCT/EP2011/056728 on Apr. 28, 2011.

(Continued)

(30) Foreign Application Priority Data

Apr. 29, 2010    (EP) .................... 10161498

(51) Int. Cl.
*B01D 57/02*    (2006.01)
*C02F 11/12*    (2006.01)
(Continued)

(52) U.S. Cl.
CPC ............ *B01D 57/02* (2013.01); *B01D 43/00* (2013.01); *B08B 1/005* (2013.01); *B28C 1/08* (2013.01);
(Continued)

(58) Field of Classification Search
CPC .......... B01D 57/02; B01D 43/00; B28C 1/08; B28C 1/082; B03C 5/00; B03C 5/02;
(Continued)

(56) References Cited

U.S. PATENT DOCUMENTS

| 1,133,967 A | 3/1915 | Illig et al. |
| 3,700,107 A | 10/1972 | Flaviani |

(Continued)

FOREIGN PATENT DOCUMENTS

| EP | 0253749 A1 | 1/1988 |
| EP | 2329712 A1 | 6/2011 |

(Continued)

OTHER PUBLICATIONS

Cutaway Shansei Arsenal Broomhandle semi-auto pistol. For sale through Feb. 24, 2010. <http://www.icollector.com/Cutaway-Shansei-Arsenal-Broomhandle-semi-auto-pistol-entire-right-side-of-gun-has-been-expertly-cut__i8787151> accessed Mar. 12, 2016.*

(Continued)

*Primary Examiner* — Steven A. Friday
(74) *Attorney, Agent, or Firm* — Amster, Rothstein & Ebenstein LLP

(57) ABSTRACT

The present invention relates to a system and a method for the concentration of slurry, especially mineral containing slurry. The invention provides a system comprising an electrophoresis unit and a separation unit, where the separation unit comprises a recipient, preferably of half cylindrical form, with adjusted flanks for separating the solid material or cake from the rotating anodes and a sliding carriage suitable for closing the recipient and stripping resting solid material from the flanks into the recipient before the solid material or cake is pressed out of the recipient by a piston.

2 Claims, 9 Drawing Sheets

Related U.S. Application Data

Figure 1:
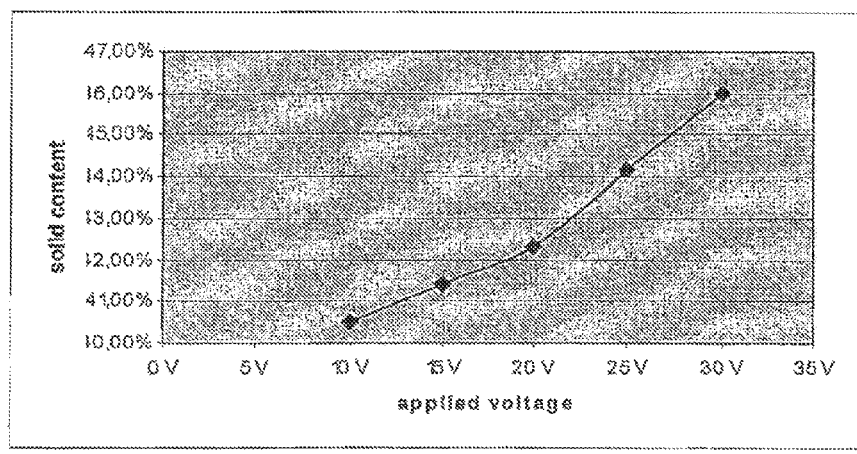

(60) Provisional application No. 61/331,951, filed on May 6, 2010.

(51) Int. Cl.
    *B28C 1/08*     (2006.01)
    *C02F 1/469*     (2006.01)
    *B01D 43/00*     (2006.01)
    *B08B 1/00*     (2006.01)

(52) U.S. Cl.
    CPC .......... *C02F 1/4696* (2013.01); *C02F 11/121* (2013.01); *C02F 2303/16* (2013.01)

(58) Field of Classification Search
    CPC .... C02F 1/4696; C02F 11/006; C02F 11/121; C02F 11/126; C02F 11/128
    See application file for complete search history.

(56) References Cited

U.S. PATENT DOCUMENTS

| | | |
|---|---|---|
| 3,972,799 A | 8/1976 | Taylor et al. |
| 4,107,026 A | 8/1978 | Freeman |
| 4,115,718 A | 9/1978 | Eggelsmann |
| 4,134,820 A | 1/1979 | Ellis et al. |
| 5,171,409 A | 12/1992 | Barnier et al. |
| 6,193,869 B1 | 2/2001 | Towe et al. |
| 2008/0217065 A1 | 9/2008 | McCosh |
| 2009/0301223 A1 | 12/2009 | Sihler et al. |

FOREIGN PATENT DOCUMENTS

| | | |
|---|---|---|
| FR | 2367526 A1 | 5/1978 |
| GB | 2077293 A | 12/1981 |
| GB | 2259459 A | 3/1993 |
| RU | 185805 | 11/1996 |
| SU | 129182 A1 | 11/1959 |
| SU | 377164 A2 | 4/1972 |

OTHER PUBLICATIONS

M1911. "1911 Pistol Cycling" video <https://www.youtube.com/watch?v=r3NRyP7uFl0> Uploaded Mar. 25, 2008. Accessed Mar. 12, 2016.*

Granovsky M.G. et al., Elecrotreatment of Liquids, Chemistry, Leningrad, 1976, 1976.

Chinese Office Action dated Jul. 1, 2013 for Chinese Application No. 201180026354.8.

Translation of Notice of Rejection dated Jan. 6, 2015 for Japanese Application No. 2013-506658.

Russian Official Action for Russian Application No. 2012151157, Mar. 2015.

The International Search Report dated Jan. 8, 2011 for PCT Application No. PCT/EP2011/056728.

The Written Opinion of the International Searching Authority dated Jan. 8, 2011 for PCT Application No. PCT/EP2011/056728.

* cited by examiner

SYSTEM AND METHOD FOR THE CONCENTRATION OF A SLURRY

CROSS-REFERENCE TO RELATED APPLICATIONS

This is a Divisional of U.S. application Ser. No. 13/641,755, filed Dec. 21, 2012, which is the U.S. national phase of PCT Application No. PCT/EP2011/056728, filed Apr. 28, 2011, which claims priority to European Application No. 10161498.0, filed Apr. 29, 2010 and U.S. Provisional Application No. 61/331,951, filed May 6, 2010, the contents of which are hereby incorporated herein by reference in their entirety.

FIELD OF THE INVENTION

The present invention relates to a system and a method for the concentration of slurry, especially mineral containing slurry.

BACKGROUND OF THE INVENTION

Mineral processing often requires the addition of water. This may result in an overly dilute slurry containing the mineral so that it is necessary to concentrate the finely granulated minerals of the suspension for further processing. Depending on the required final concentration of the mineral, different methods are used for the dewatering process. Besides methods like centrifugation, filtration or evaporation it is known that the dewatering of slurries can be achieved by electrophoresis or electroosmosis leading to the formation of a solid layer or cake.

U.S. Pat. No. 1,133,967 discloses an apparatus for an electroosmotic process having a suspension container and suspension agitating means, which comprise an anode and a cathode locked between the anode and the agitating means, where the cathode is provided with openings of much greater length than width. The anode according to this invention is cylindrical.

U.S. Pat. No. 3,972,799 describes an apparatus for removing solids from drilling mud. The apparatus comprises a horizontal container with a plurality of spaced-apart rotating plate-like discs as anodes arranged between pluralities of spaced-apart interconnected panels as cathodes with a peripheral portion of each disc immersed in the drilling mud, where the discs are rotated by a motor. Solids in suspension are attracted by and deposited as a layer or film on opposing surfaces of the respective discs and stationary scraper blade elements arranged adjacent to the discs remove the deposited solids.

To achieve the exposure of a solid layer or cake from a suspension, rotating anodic discs are proposed by U.S. Pat. No. 4,107,026 that discloses a system and a method for dewatering of a suspension of solids in an electric field controllably maintained between a pair of opposing self-contained electrode structures, to cause the solids to migrate relatively to the carrier liquid to form a layer or cake on the respective self-contained electrode structure, while allowing carrier liquid to be withdrawn under vacuum in the opposite direction through the liquid-pervious wall of a hollow self-contained counter electrode structure, combined with means for controlling the rate of filtrate liquid withdrawal consistent and compatible with the relative speed of migration of the solids in the carrier liquid and wherein said layer or cake material may be detached from said electrode structure, for instance during exposure from the suspension.

In order to increase the efficiency of electrophoretic separation, U.S. Pat. No. 5,171,409 (the equivalent of EP 0 253 749) proposes a process of continuously separating electrically charged, solid pulverous materials in the form of a suspension in an electrophoresis and electroosmosis cell, wherein a fraction of the catholyte is drained off, a portion thereof is treated with an acid, preferably gaseous, agent, the treated portion is re-introduced into the cathode compartment, whereas the other part of the drained-off fraction is eliminated. As the method and device disclosed in this document are very complicated to handle, there is a need for a device that is easy to handle in combination with a high rate of yield.

Although the processes of dewatering suspensions by electrophoresis or electroosmosis are known in the state of the art, both methods are associated with a dissatisfactory degree of mineral cake or solid recovery, especially in the case of calcium carbonate recovery in the form of a sticky mineral cake or solid.

DESCRIPTION OF THE INVENTION

It is an object of the present invention to provide a system and a method for the concentration of slurry containing minerals, avoiding the disadvantages of known systems and methods.

According to the invention a device is provided for the concentration of a slurry, with a supporting structure for receiving modules therein, the modules comprising:

a. an electrophoresis cell with at least one electrically connected cathode, and at least one electrically connected, rotatable anode disc, b. separation units adjacent to each anode surface for receiving the cake material, comprising a recipient and a piston, wherein the shoulders of the recipient are dimensioned to act as scraping flanges for taking off the solid material or cake from the anodes and the piston for pressing the collected material or cake out of recipient, and optionally a sliding carriage with a cover for closing the recipient, and c. means for turning the anodes, circulating slurry in and out of the electrophoresis cell, and applying voltage to the electrodes The electrophoresis cell may be a container for taking up the slurry, designed to include a single or multiple-compartments for electrophoresis. In the preferred embodiment where the electrophoresis cell is a multiple-compartment cell, this may be formed by welding plates into the container, so that the multiple-compartment container is made from an outer container shell with flanges fixed inside the container to form the compartments. In a further preferred embodiment, the multi-compartment slurry container is a single integral piece.

Although it is intended that the whole container, including a multi-compartment container, functions as cathode, it is also within the scope of the invention that the cathode is represented by one or more plates or other means positioned in the electrophoresis cell. If the electrophoresis cell or container is the cathode, no separate linkage to the power supply is necessary and the (multi) compartment slurry container is electrically isolated from all other components.

It is intended that the anode discs be partially exposed to the slurry and partially exposed to a gaseous environment such as air. It is further intended that the shoulders of separation units be located adjacent to a portion of anode exposed to a gaseous environment. It is preferred that the separation units be located in an approximately horizontal position.

It is preferred that the anode discs are arranged vertically within a given compartment. In order to rotate the anode discs, they are preferably mounted on a drive shaft for rotation. Further the anode discs can be fixed on the drive shaft by means of fixation flanges, defining the distance between the anode discs. The anodes respectively the anode discs are electrically connected by jumper rings that are provided.

If it is necessary, due to a special composition of slurry, altered container and altered anode disc spacing can be used. In a preferred embodiment, the outer wall of the container is half cylindrical and adjusted to the diameter of the anodes to produce a predefined distance between cathode and anode discs. The half cylindrical container design facilitates the requirement that the anodes are only partially exposed to the slurry.

In another preferred embodiment, at least one inlet opening for the slurry is positioned at the bottom of each electrophoresis cell and an overflow at the upper margin. In an alternative embodiment the inlet openings can be distributed over the circumference of each cell.

The preferred material for the anodes is titanium with an anticorrosive coating. For positioning of the anodes, muffs may be used to ensure an appropriate distance is maintained between the cathode(s) and anodes, said distance being critical for the dewatering process. Alternating muffs and anode discs can form a unit that is slid onto the shaft. It is also important that the distance between the anode disc and the separation unit be constant. Cross sectional areas of the muffs may be used to guarantee that the anode discs cannot move on the shaft.

The jumper ring can be made with gold contacts so that higher voltages are possible in up scaled systems. The contacts are preferably elastic.

For the supporting frame, the preferred material is aluminium. This frame represents the backbone of the system and all other parts are attached to this frame. Plates of synthetic material can be used to isolate the supporting frame from the container when the latter represents the cathode. Further plates may be used as support for the anode unit and the motor for rotating the anode respectively the shaft.

The preferred form of the recipient of the separation unit is half cylindrical or half rectangular with a piston adapted to the recipient form. It is obvious for a person skilled in the art that other forms may apply to the recipient. The separation unit is preferably made of synthetic material, especially poly-tetra-fluoroethylene (PTFE) or any other material with good sliding properties. Since the shoulders of the half cylinder are adjusted to the adjacent anode discs there is no need for a separate scraper. This has the major advantage that solid material or cake will not be collected on the scraper. In combination with the sliding carriage for closing the separation unit, the solid material will be completely pressed out of the separation unit. An open half cylinder, i.e. without a sliding door, resulted in experiments of the inventors in solid material that has been accumulated on the scraper and the piston resulting in an incomplete removal of the solid material or cake.

The separation unit is ideally exactly positioned between two anode discs, such that the separation unit may serve to remove cake from two anode discs simultaneously. The resting opening between separation unit and anode is preferably about 1 mm. The separation unit may be fixed by synthetic mountings at the supporting frame.

By making piston and half cylinder from the same material, any disadvantages according to different thermal expansion are avoided.

It is preferred that the piston be driven pneumatically. Any other means for driving the piston, e.g. hydraulically, are also within the scope of the invention.

Since the process for the concentration of slurry is preferably driven discontinuously, the angle of rotation of the anodes in each cycle shall be preferably about 10° in combination with a preferred length of stay of the anode segments of about 3 min.

In a preferred embodiment, a voltage between 10 V and 40 V is applied to the electrodes. The voltage depends on the material forming the electrodes and the composition of the slurry. It should be limited with regard to corrosion of the anode and thus not be above 60 V.

The device according to the invention is optimized for slurry that has a mineral content of preferably between 10-50% and more preferably between 20-24% and a defined particle size. Parameters such as voltage can be adjusted to other slurries without changing the distance between the electrodes as this is predetermined by the construction of an electrophoresis cell.

The preferred material to be used in the device is slurry containing negatively-dispersed calcium carbonate particles.

Another object of the present invention is a method for the concentration of a slurry using a device according to the invention comprising the following steps:
  a. Introducing a slurry with dispersed particles in the electrophoresis cell of said device;
  b. Applying voltage to the resting electrodes of the electrophoresis cell;
  c. Rotating each anode a defined angle of rotation and stripping resting solid material or cake into the recipient of the separation unit of said device;
  d. Optionally closing said recipient with a sliding carriage;
  e. Pressing the solid material or cake out of the separation unit with a piston;
  f. Optionally introducing fresh slurry into the electrophoresis cell via the inlet opening and removing excess slurry via the outlet of each cell and repeating steps a to f.

It is preferred that the concentration process be driven discontinuously, implying a step of the anode resting in the slurry and a step of the anode being rotated in order to receive the solid material or cake, in order to be able to remove the material efficiently.

The method is optimized for slurries containing mineral particles, especially calcium carbonate and notably negatively-dispersed calcium carbonate. Cationically dispersed calcium carbonate may additionally or alternatively be employed.

To optimize the stability of the solution and the charge of the particles it is preferred that tensides, such as dispersants, be added to the slurry. As the tensides become attached to the particles, the resulting charge corresponds to the charge of the tenside. In this way it is possible to enhance or change the charge of the dispersed particle so that they will move to the anode or cathode as required.

The optimal parameters for the method are a voltage of about 20 V and an angle of rotation of about 10°, where hoist time and interval time can be adjusted to characteristics of the slurry. Preferred is a length of stay of the anode disc of about 3 min.

The process of cake collection, i.e. the anode rotation, is interrupted while the piston is fully extended. The piston has to be drawn back before the anode can rotate again to avoid the collection of cake behind the piston leading to problems at the draw back of the piston.

DETAILED DESCRIPTION OF THE FIGURES

Figure 2:
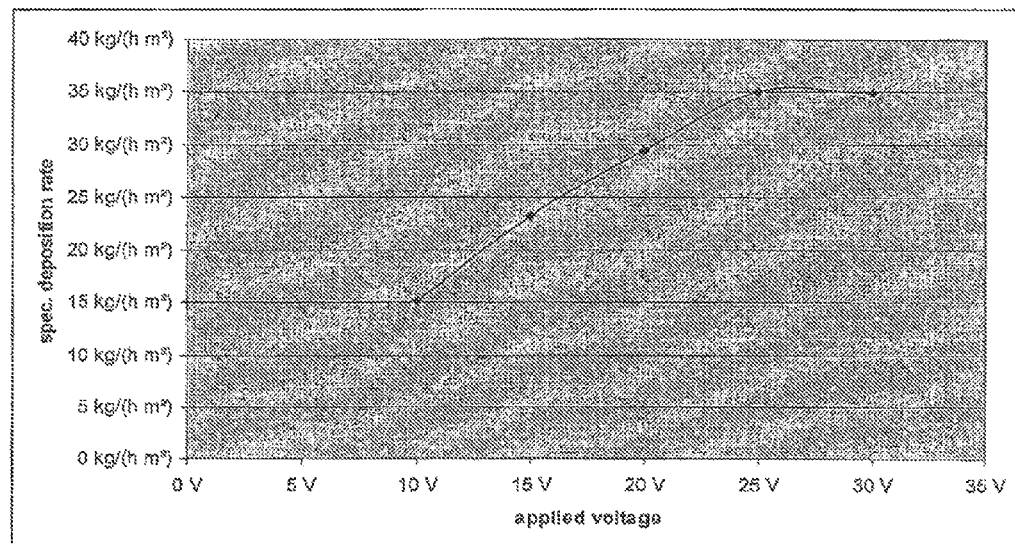
Figure 3:
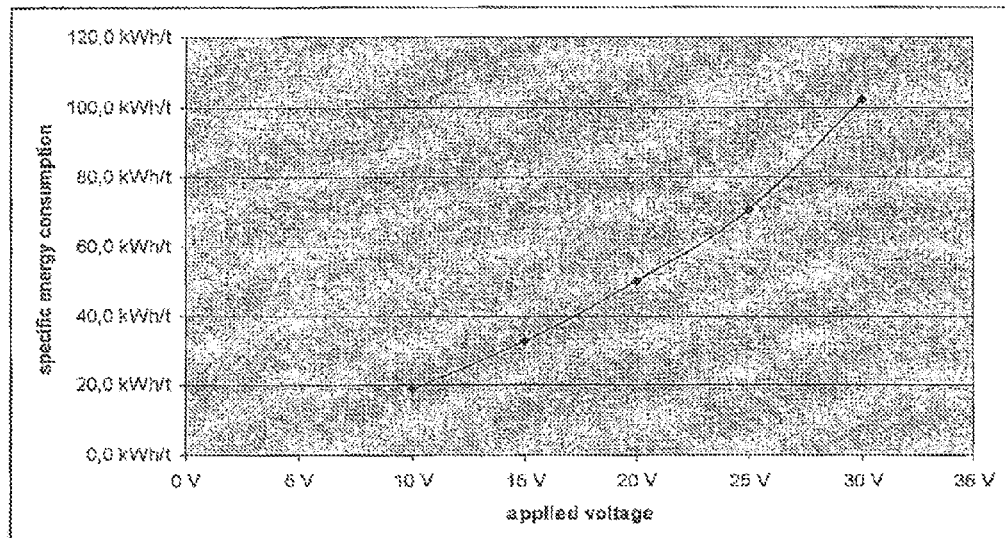
Figure 4:
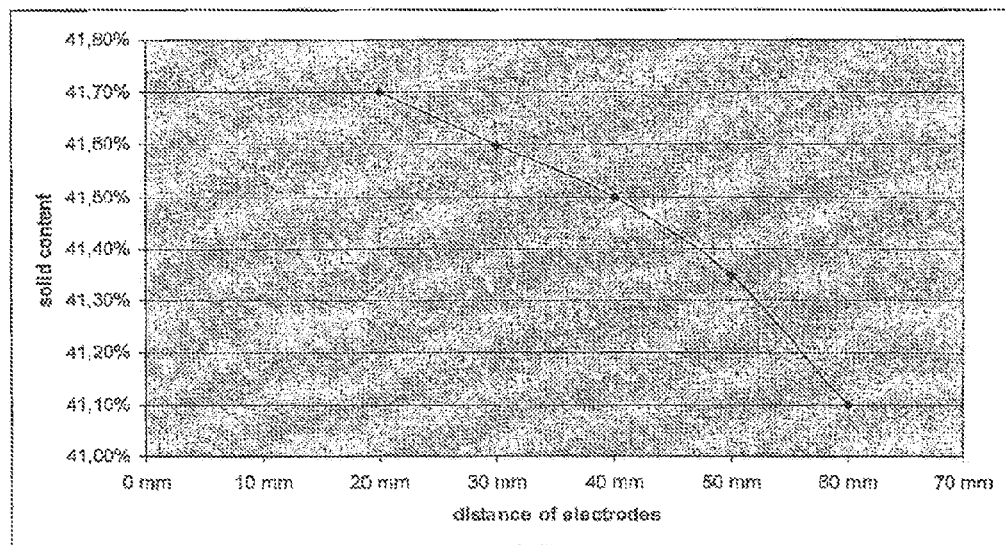
Figure 5:
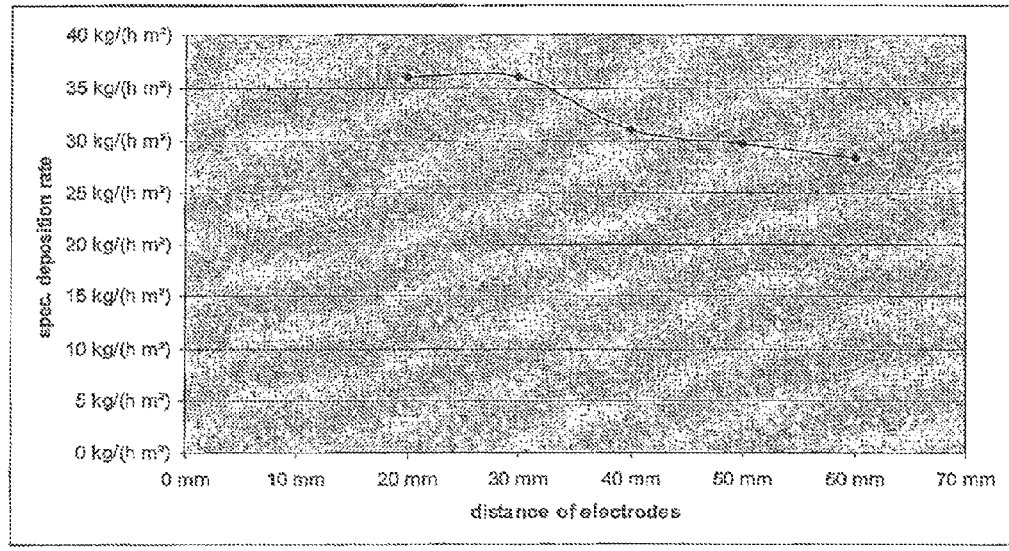
Figure 6:
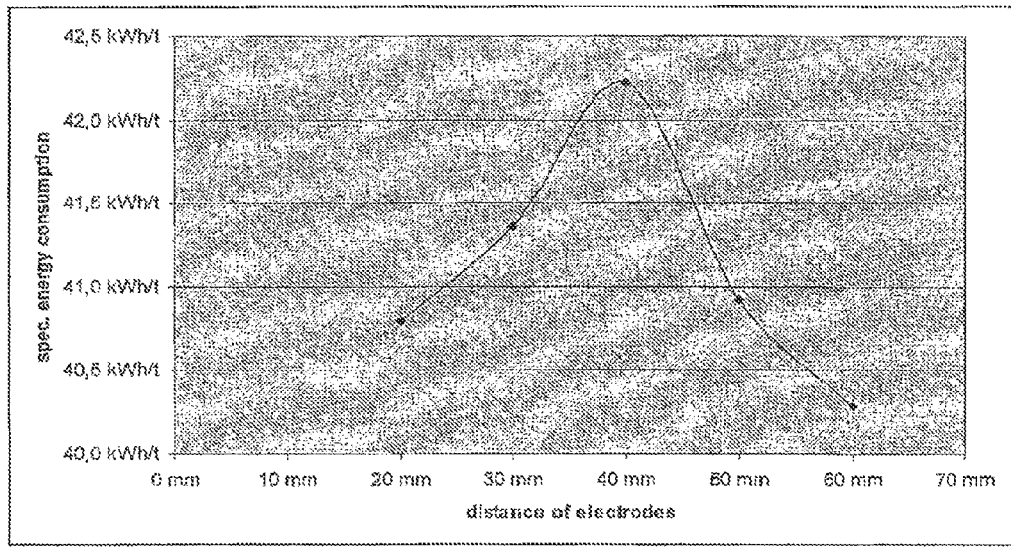
Figure 7:
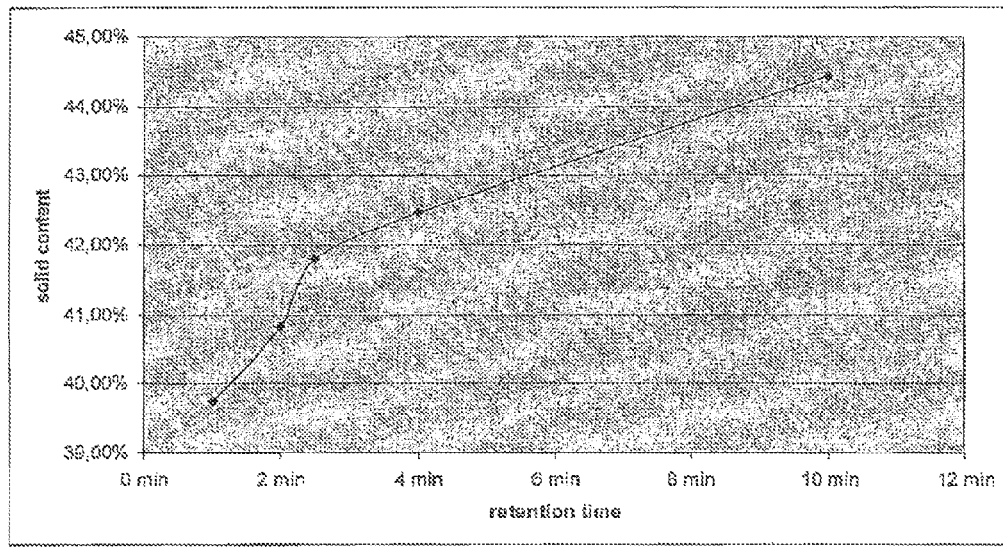
Figure 8:
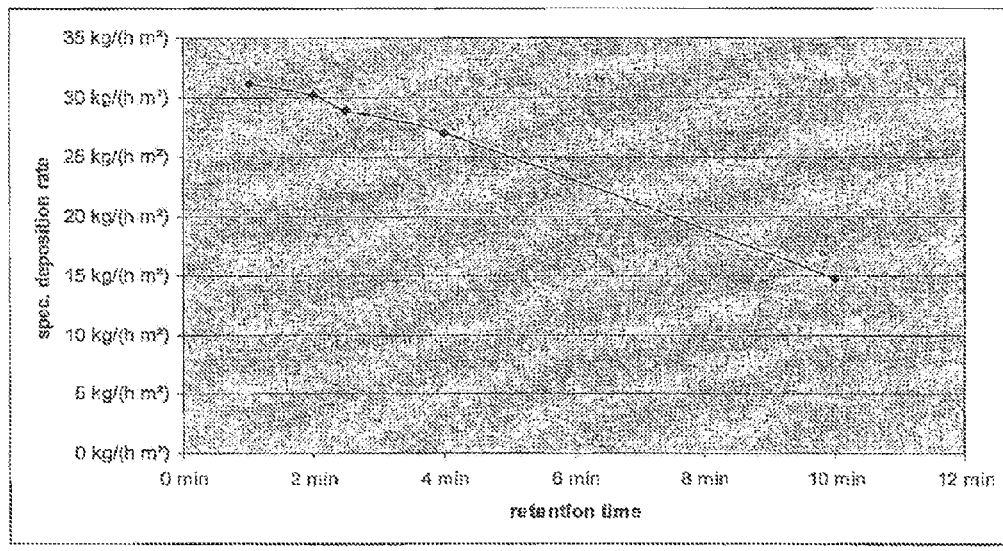
Figure 9:
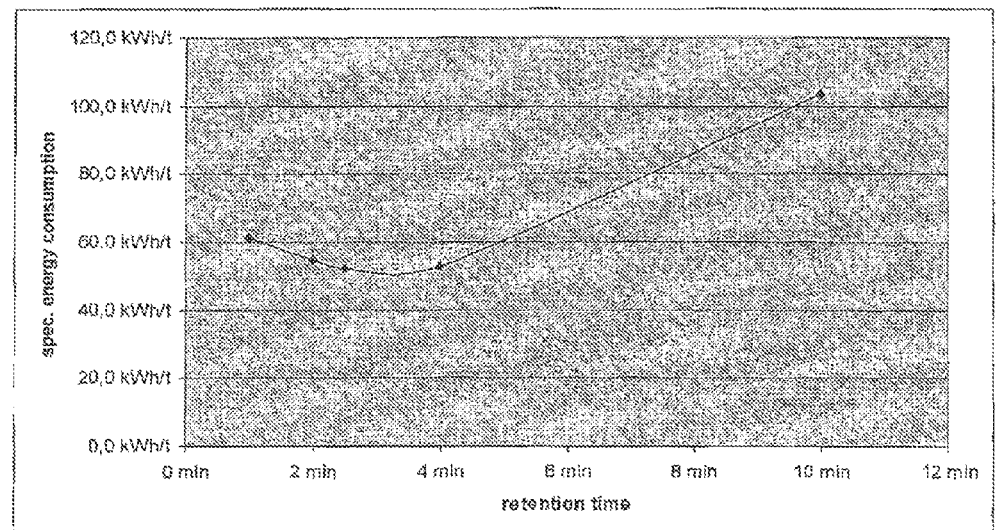
Figure 10:
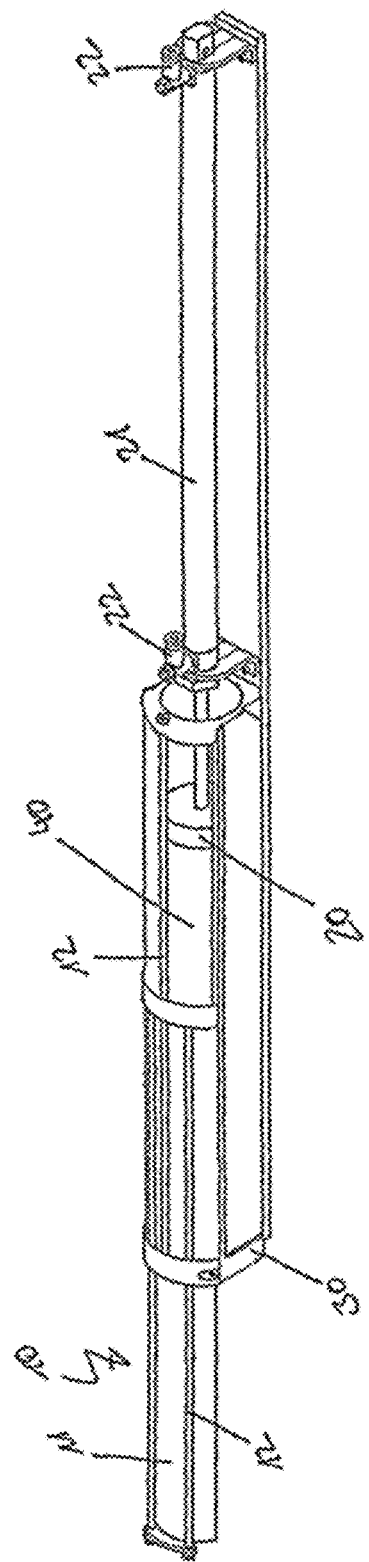

The invention will be further described by figures and examples without being limited to the described embodiments:

FIG. 1 Plot of the solid content of the deposition cake against the voltage applied to the electrodes FIG. 2 Plot of the specific deposition rate against the voltage applied to the electrodes FIG. 3 Plot of the specific energy consumption against the voltage applied to the electrodes FIG. 4 Plot of the solid content of the deposition cake against the distance of the electrodes FIG. 5 Plot of the specific deposition rate against the distance of the electrodes FIG. 6 Plot of the specific energy consumption against the distance of the electrodes FIG. 7 Plot of the solid content depending on the retention time FIG. 8 Plot of the specific deposition rate depending on the retention time FIG. 9 Plot of the specific energy consumption depending on the retention time FIG. 10 Separation unit FIG. 11 A, B: Arrangement of the separation units and anode discs FIG. 12 Electrophoresis cell with inlet and overflow FIG. 1 shows that the voltage applied to the electrodes has a considerable influence on the solid content of the deposition cake resp. the osmosis. Solid content and deposition rate (FIG. 2) increase with raising the voltage, but the energy consumption (FIG. 3) increases disproportionally. The reason for this effect is an increase in electrolysis of the contained water. It is a serious problem that the electrophoresis of the water content leads to the production of hydrogen and oxygen, which form an explosive mixture with the surrounding air. It is not possible to reduce the voltage to a level that no hydrogen is produced.

Consequently, a compromise had to be determined allowing a good productivity with reasonable energy consumption. Most experiments were done with a voltage of 20 V, although the voltage might range from 10 to 60 V.

Further experiments were performed in order to determine a distance of the electrodes with regard to the solid content (FIG. 4), specific deposition rate (FIG. 5) and the specific energy consumption (FIG. 6). The distance of the electrodes can usually only be changed with an immense effort, e.g. with movable cathodes, so that it is import to know an optimal distance of the electrodes for the construction of an electrophoresis device.

The results shown in FIGS. 4 to 6 were obtained by applying a voltage of 20 V. It is clearly visible that a short distance of the electrodes correlates with an increase of efficiency of the electrophoresis, viz. solid content and deposition rate increase with a decrease of energy consumption. This means that a short distance of electrodes has to be preferred.

It has to be taken into account that the deposition cake on the anode reduces the opening between cathode and anode. The experiments showed a physical thickness of the anode cake of about up to 10 mm. It has to be guaranteed that the residual opening between the electrodes is suitable for the flow through of the slurry. In FIG. 5 a stagnation of the deposition rate can be observed for a distance of electrodes above 20 mm. This might reflect the effect of minimizing the opening between the electrodes by the anode cake.

By using rotating anodes different modes of performing the electrophoresis can be applied. The anodes can rotate continuously or in intervals. The increasing anode cake on the anode disc 50 leads to an increase of the electrical resistance as the solid cake has a higher electrical resistance than the slurry. As a consequence the deposition rate decreases (FIG. 8) and the energy consumption increases (FIG. 9), while the solid content of the anode cake still increases (FIG. 7).

The results of the experiments for determining a reasonable retention time as shown in FIGS. 7 to 9 were performed with a voltage of 20 V, an electrode distance of 40 mm and an angle of rotation of 45°.

Angle of rotation and retention time are important parameter with regard to the total amount of anode cake deposited on the anode disc 50. The volume of the anode cake has to correlate with the volume of the separation unit in order to avoid overfilling of the separation unit, as this would lead to remaining solid particles on the anode disc 50. The skilled man would adapt the degree of rotation according to the thickness of the cake on the anode, i.e. the thicker the cake is, the smaller the degree of rotation of the anode before the recipient 40 is filled.

Some restrictions have to be taken into account while defining the parameters for the construction of the device and performing the electrophoresis. Applying high voltage to the electrodes should be avoided since the side effect of hydrogen production has to be reduced for safety reasons. The distance of electrodes is basically predefined by the concept of the multi compartment slurry container 60 as shown in FIG. 11. The remaining parameters have to be chosen in order to optimize solid content of the anode cake and obtain a high deposition rate.

Table 1 shows the parameters that have been chosen for a device according to the invention.

| Starting parameter (preferred parameter) | solid content | | spec. deposition rate | | spec. energy consumption | |
|---|---|---|---|---|---|---|
| | (%) | $F_{FS}$ | ($^{kg}/_{m^2 h}$) | $F_{AR}$ | ($^{kWh}/_{l}$) | $F_{EV}$ |
| U = 20 V | 42.3 | | 29.4 | | 49.9 | |
| H = 40.0 mm | 41.5 | 1.000 | 31.1 | 1.045 | 42.2 | 0.988 |
| (H = 37.5 mm)* | (41.5) | | (32.5) | | (41.7) | |
| $t_v$ = 4 min | 42.5 | 0.988 | 27.0 | 1.056 | 52.8 | 0.985 |
| ($t_v$ = 3 min)* | (42.0) | | (28.5) | | (52.0) | |
| α = 45° | 38.9 | 1.131 | 19.7 | 1.131 | 46.7 | 0.642 |
| (α = 10°)* | (44.0) | | (24.0) | | (30.0) | |
| Preferred operating cond. | 47.3 | | 39.5 | | 31.2 | |

Values not corresponding exactly to measured values have been extrapolated according to the curve progression (*). Starting point for the calculation has been taken from the results obtained for the variation of the voltage, shown in the top line of table 1. The changes of solid content, deposition rate and energy consumption were taken from experiments varying electrode voltage, retention time and angle of rotation. Using the preferred parameters in preferred operating conditions, results in the solid content, deposition rate and energy consumption shown in the line at the bottom. The voltage should be adjusted to 20 V and the electrode distance H chosen according to the construction of the slurry container 60. The retention time should be about 4 min and the angle of rotation 45° in order to optimize solid content, deposition rate and energy consumption.

FIG. 10 shows a separation unit that comprises a recipient 40 for receiving the cake material from a rotating anode 50. The shoulders 30 of the recipient 40 are dimensioned to act as scraping flange for taking off the solid material or cake from the anodes 50. Collected material will be pressed out of the recipient 40 by a piston 20 which is driven by a pneumatic cylinder 21 that is regulated through valves 22. It is intended that the recipient could be closed with a sliding carriage 10. The sliding carriage 10 comprises a cover 11 and guiding rods 12.

It is further intended that the sliding carriage 10 for closing the recipient 40 has a wiper at the front, for collecting residual material from the shoulders 30 into the recipient 40 while closing it.

Figure 11A:
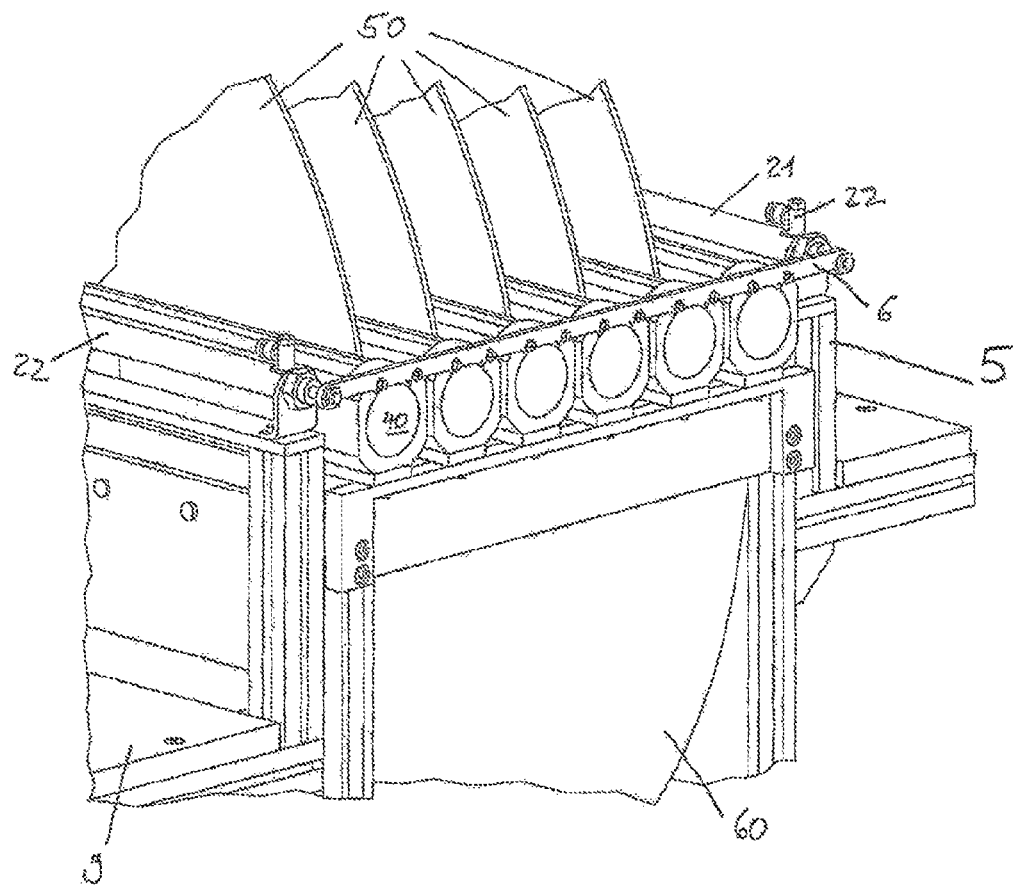
Figure 11B:
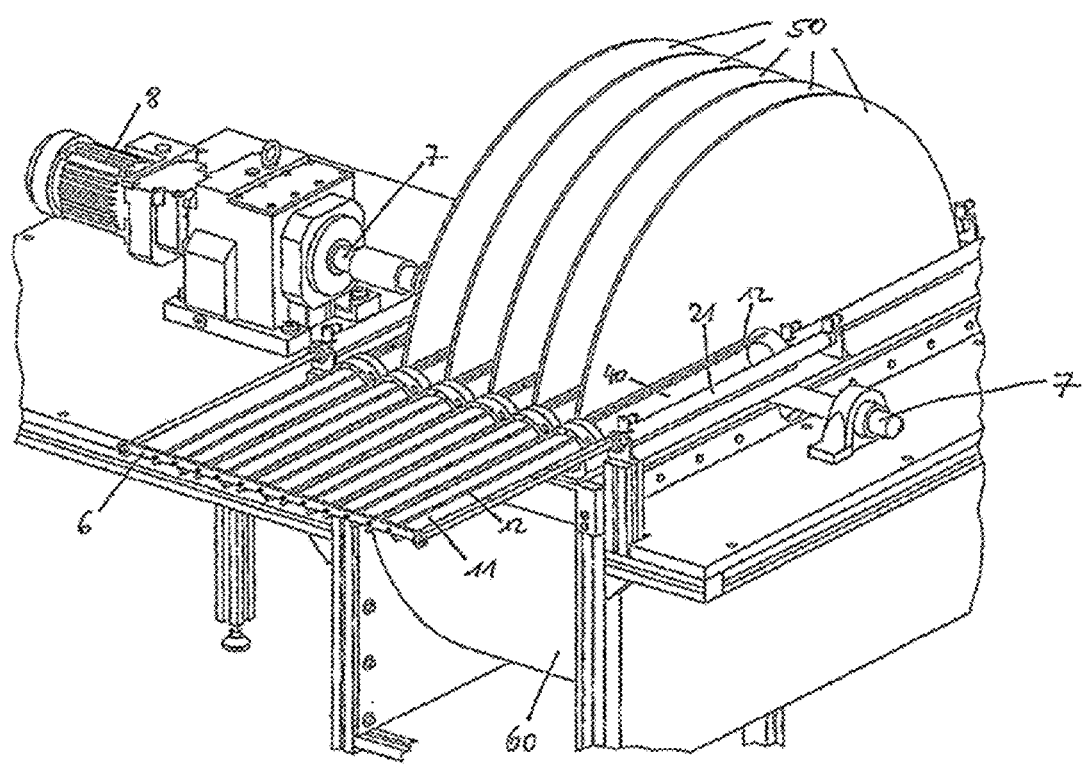

FIG. 11 shows the arrangement of the separation units and the anode discs 50. In FIG. 11A the recipients 40 are closed in order to press the collected solid material out by moving the piston 20. In FIG. 11B the recipients are open and ready for collecting solid material from the rotating anodes 50. In order to open or close the recipient 40 all recipients 40 which are arranged next to anode discs 50 are connected via a connection bar 6. At their ends the connection bars 6 are connected with the pneumatic cylinders 21 that are mounted onto the frame 5. The anode discs 50 are rotating vertically in the container 60. The anode discs 50 are fixed on a drive shaft 7 that is rotated by a single drive 8 being mounted on a stationary table 9. The recipients can be closed with the sliding carriage 10 comprising cover 11 and comprising guiding rods 12.

Figure 12:
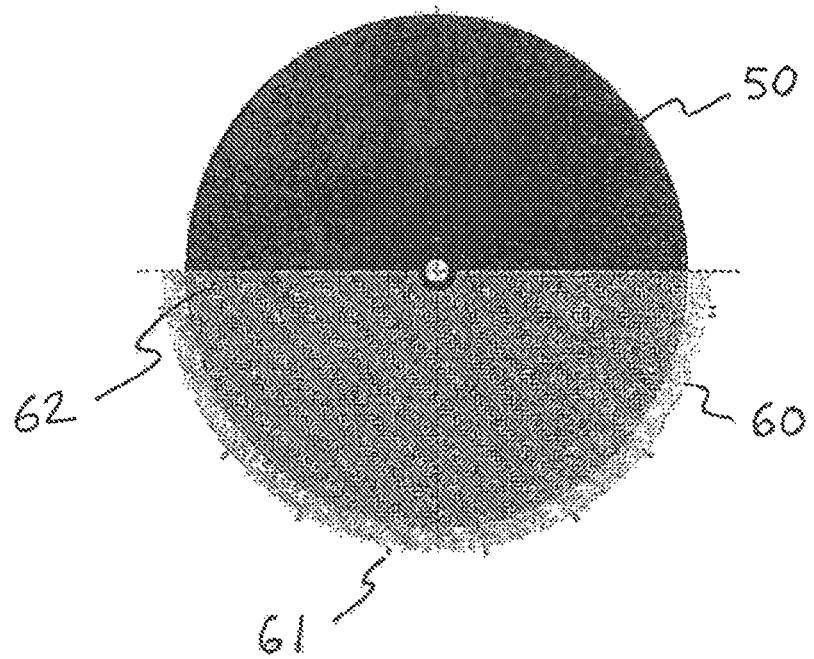

FIG. 12 shows an electrophoresis cell with inlet 61 and overflow 62. A vertical rotating anode disc 50 rotates within a compartment of a multi compartment container 60. Slurry is filled in at the inlet openings 61 and the dewatered slurry leaves the container via the overflow 62. It is intended to arrange the inlet openings 61 at the bottom of the container 60 and the outlet 62 at the upper margin of the container 60.

It is possible to fill each compartment of a multi compartment container 60 with fresh slurry by equally dividing the flow of fresh slurry. It is advantageous that only one pump might be used for this way of filling an electrophoresis cell. Another possibility is to fill a compartment with the overflow slurry of the previous compartment, resulting in a solid content gradient in a row of compartments. It has to be noted that the formation of solid material on the anodes 50 stops below a solid content of the slurry of about 9 to 10%, so that a slurry with a solid content below this value might be supplemented with solid material from a buffer storage or has to be removed from the process.

REFERENCE NUMBER LIST

5 frame
6 connecting bar
7 drive shaft
8 single drive
9 stationary table
10 sliding carriage
11 cover
12 guiding rod
20 piston
21 pneumatic cylinder
22 valve
30 shoulder
40 recipient
50 anode disc
60 container
61 inlet
62 overflow

The invention claimed is:

1. A separation unit for use with a device for the concentration of slurry, the separation unit comprising a recipient and a piston adapted to the recipient form, wherein the recipient has shoulders dimensioned to act as scraping flanges for cake material, the piston is dimensioned for pressing cake material out of the recipient, the separation unit has a sliding carriage with a cover for closing the recipient and collecting residual cake material from the shoulders into the recipient while closing it, the recipient has a half cylindrical or half rectangular form, and the separation unit has a pneumatic cylinder that drives the piston pneumatically.

2. The separation unit according to claim 1, wherein the separation unit is made of poly-tetra-fluoroethylene.

* * * * *